United States Patent [19]
Znamensky et al.

[11] Patent Number: 5,524,827
[45] Date of Patent: Jun. 11, 1996

[54] METHOD AND NOZZLE FOR PRODUCING THRUST

[76] Inventors: Vladimir P. Znamensky, ulitsa Tolstogo, 6, kv. 121, Moskovskaya oblast, Kaliningrad; Sergei V. Sokolov, Leningradsky prospekt, 28, kv. 178; Vladislav D. Chekmasov, Pyatnitskoe shosse, 7, kv.444, both of Moscow, all of Russian Federation

[21] Appl. No.: 315,863

[22] Filed: Sep. 30, 1994

[30] Foreign Application Priority Data

Oct. 1, 1993 [RU] Russian Federation ............ 93046474

[51] Int. Cl.$^6$ ............................. B05B 12/00; B63H 11/00
[52] U.S. Cl. ............................ 239/265.33; 239/265.35; 244/12.5; 244/23 D; 60/232; 60/271
[58] Field of Search ........................ 239/265.11, 265.19, 239/265.25–265.29, 265.33, 265.35; 244/12.5, 23 D, 52, 110 B; 60/230, 232, 262, 271

[56] References Cited

U.S. PATENT DOCUMENTS

| | | | |
|---|---|---|---|
| 3,041,830 | 7/1962 | Thomas et al. | 244/52 X |
| 3,130,544 | 4/1964 | Penza | 239/265.19 |
| 3,319,892 | 5/1967 | Zirin | 239/265.35 |
| 3,636,710 | 1/1972 | Lovingham | 60/281 |
| 3,888,419 | 6/1975 | McCoullough | 239/265.19 |
| 4,168,031 | 9/1979 | McCullough et al. | 239/265.35 X |
| 4,993,638 | 2/1991 | Lardellier | 239/265.39 X |

FOREIGN PATENT DOCUMENTS

| | | | |
|---|---|---|---|
| 225269 | 5/1959 | Australia | 60/262 |
| 567048 | 12/1958 | Canada | 239/265.35 |

OTHER PUBLICATIONS

Flight International, 1982, v. 121, 20/III, No. 3802.
D. A. Lander et al. "Augmented Deflector . . . ", AIAA/SAE 11th Propulsion Conference, California Sep. 29–Oct. 1, 1975.
O. C. Pendergraft, Jr. "Comparison of Axisymmetric . . . " AIAA/SAE 13th Propulsion Conference, Florida, Jul. 11–Jul. 13, 1977.
C. M. Willard, "Static Performance of Vectoring . . . ", AIAA/SAE 13th Propulsion Conference, Florida, Jul. 11–Jul. 13, 1977.

*Primary Examiner*—Andres Kashnikow
*Assistant Examiner*—Lesley D. Morris
*Attorney, Agent, or Firm*—Ladas & Parry

[57] ABSTRACT

A method and apparatus for producing a thrust force from an annular axial stream of gaseous products fed to a nozzle with a supercritical pressure drop and acceleration to subsonic speed. In the nozzle, the direction of the subsonic annular stream is changed from axial to radial and the radial stream is divided into a plurality of opposing jets which collide in a braking zone and change direction back to axial for discharge into the ambient atmosphere. A change in thrust intensity (modulus) is effected by changing the flow rate of the radial jets and/or the flow rate of the axial stream discharged into the ambient atmosphere. Adjustment of the angle of the thrust vector is effected by changing the angle of discharge of the axial stream into the ambient atmosphere. The nozzle comprises a housing, a central body with a flat base in the housing, and a casing surrounding the central body and having an end face with profiled outlet edges forming together with the flat base of the central body a radial channel with a critical cross section and an axial outlet. The casing is axially adjustable and the central body is angularly movable to adjust the flat base from a position perpendicular to the longitudinal axis of the nozzle to an angular position relative thereto.

4 Claims, 4 Drawing Sheets

METHOD AND NOZZLE FOR PRODUCING THRUST

FIELD OF THE INVENTION

The present invention relates to the field of jet power engineering, in particular to a method for producing a thrust and an apparatus for its realization. The invention is designed for use in aircraft propulsion systems with thrust vector adjustment by means of a multifunctional propulsion nozzle.

DESCRIPTION OF PRIOR ART

It is well known that the most effective way to improve the maneuverability of modern aircraft, especially at minimum and maximum flying speeds, is to use propulsion systems provided with nozzles which ensure the possibility for adjustment of the thrust vector together with the usual aerodynamic surfaces, since in that case an additional lift induced by a jet is developed.

Multifunctional nozzles are being developed at the present time wherein adjustment of the thrust intensity (modulus) is accomplished in the traditional manner by changing the area of the effective critical cross section of the nozzle of a jet engine, as is provided for in a turbojet engine comprising a combustion chamber and an annular nozzle with a central body installed with the possibility of axial movement, which are disposed in the gas line of the turbocompressor unit (Flight International, 1982, v. 121, 20/III, No. 3802, pp. 668–671), while the deflection of the thrust vector (i.e. change in the direction of the jet) is provided for by either turning a hinged nozzle (U. W. Lowe. AV-8B flying qualities and performance integration from design to flight test. Cockpit, 1983, v. 18, VII–IX, No. 3, pp. 5–11), or by opening movable flaps located on the side walls of the nozzle (G. McLaffrty and J. Peterson. Results of Tests of a Rectangular Vectoring/Reversing Nozzle on an F100 Engine. AJAA-83-125, 1983). J. A. Lander, D. O. Nash and J. L. Paleza. Augmented Deflector Exhaust Nozzle/ADEN/ Design for Future Fighters. AJAA Paper No. 1318, 1975), or by moving a central body made as a rule as a wedge located in the nozzle with the possibiltiy of changing its angle of installation relative to the longitudinal axis (C. M. Willard, F. J. Capone, M. Konarski, and H. L. Stevens. Static Performance of Vectoring/Reversing Nonaxisymmetric Nozzles, AJAA Paper No. 840, 1977) or its shape (Odis C. Pendergraft, Jrs., Comparison of Axisymmetric and Nonaxisymmetric Nozzles Installed on the F-15 Configuration, AJAA Paper No. 842, 1977).

The main problem which is encountered during realization of different solutions for adjustment of the thrust vector is how to provide for the achievement of the largest angles of turn of the gas stream discharged from the nozzle with minimum losses of the resultant full effective thrust, the losses being due to deflection of the vector and impairment of the nozzle characteristics. Material factors affecting the choice of the deflection arrangement are the weight of the actuating mechanism and the power consumed to overcome the forces occurring when changes are made in the positioning of the constructive elements of the nozzle which have the purpose of adjusting the thrust vector. An increase of those forces limits the possibility of improving the flight characteristics of the aircraft. Most promising from the point of view of minimum losses and maximum efficiency of turning the gaseous jet is deemed to be the method for producing a thrust, wherein adjustment of the thrust vector is provided by changing the positioning of a central body in an axisymmetrical or flat nozzle effecting the acceleration of gaseous products incoming from a combustion chamber with a supercritical pressure drop. Thus, a multifunctional nozzle with a hinged central body installed for deflection and movement is used in a known solution for adjustment of the thrust modulus and vector (U.S. Pat. No. 3,888,419, class 239-265.19, 1979).

It can be assumed that the less the length of the central body the higher the aerodynamic losses of the stream, but in that case the force spent on deflecting the central body is reduced, and the efficiency of adjustment of the thrust vector and the magnitude of the deflection angle is improved. This is realized in an engine comprising a plate nozzle with a turning central body (U.S. Pat. No. 3,637,710, class 60-231, 1971). However, the form of the central body and the mode of its operation do not make it possible to effectively deflect the thrust vector to substantial angles, which limits the possibility of using such a solution to substantially improve the maneuverability of an aircraft.

Thus, methods are known for producing a thrust by accelerating gaseous products with a supercritical pressure drop in an annular nozzle with an outflow of opposing, almost radial, jets from the critical cross section, and subsequently discharging into the ambient medium an axial stream formed while flowing around a truncated (short) central body (plate) (V. Jlsen, Proc. 6th Symp on Ballistic Missile and Aerospace Technology, vol. III, Academic Press, pp. 171–203, 1961). Among the main drawbacks of this solution are relatively high aerodynamic losses which may increase if deflection of the central body is used to adjust the thrust vector because of the nonuniformity of the stream over the cross section of the nozzle caused by the axial component of the opposing streams.

An axisymmetrical annular nozzle for the propulsion system of an aircraft is also known, the nozzle comprising a housing and a short central body in the form of a "plate" (V. Jlsen, Proc. 6th Symp on Ballistic Missile and Aerospace Technology, vol. III, Academic Press, pp. 171–203, 1961). The housing of the nozzle at its outlet is provided with a casing encompassing the central body to form an annular duct with a slot, almost radial outlet. Such a jet nozzle, taking earlier gained experience into account, can be successfully used to obtain a thrust in an aircraft engine with adjustment of the thrust vector by changing the angle of installation of the central body. Wherein, sufficiently large angles to which the gas stream is turned can be obtained with insignificant power losses and forces for movement and deflection of the central body. However, all the drawbacks indicated above in respect of the known method (V. Jlsen, Proc. 6th Symp on Ballistic Missile and Aerospace Technology, vol. III, Academic Press, pp. 171–203, 1961) are inherent in this device, which makes its practical realization in propulsion systems difficult.

SUMMARY OF THE INVENTION

An object of the present invention is to reduce aerodynamic losses when a thrust is being produced with adjustment of the thrust vector by means of deflection of the central body in a multifunctional jet nozzle.

Another object of the invention is to increase the angle of deflection of the thrust vector.

An object of the invention is also to reduce the adjustment forces and power consumption necessary to drive the actuating mechanism to move and deflect the central body of the nozzle.

Simplification of the construction of the actuating mechanism serving to move the central body in order to adjust the thrust intensity and vector can be noted among other objects of the invention.

The essence of the present invention in accordance with the aforementioned objects is that in order to produce a thrust, an axial annular stream is formed from gaseous combustion products supplied from a combustion chamber with a supercritical pressure drop, the stream is accelerated in an annular nozzle with an outflow from the critical cross section as opposing radial jets which upon impact form a braking zone limited by the flat surface of a central body, and the stream is turned around with subsequent discharge into the ambient medium in the axial direction. Therein, the modulus (intensity) of the thrust is adjusted by changing the flow rates of the radial and axial streams, which is accomplished by changing the ratio of the effective area of the braking zone, determined as a part of the surface of the central body, which part is limited by the projection of the critical cross section of the nozzle, to the area of the critical cross section of the nozzle. The direction of the thrust vector is changed by deflecting the velocity vector of the outflowing stream during discharge into the ambient medium by deflecting the aforementioned flat surface of the base of the central body from a position perpendicular to the longitudinal axis of the nozzle.

The stated object is also achieved in a nozzle for producing a thrust and realizing the method, the nozzle comprising a housing, a central body located inside the housing, a casing in the form of a sleeve with side walls encompassing the central body to form an annular duct, and with an end face provided with outlet edges, which thereby form together with the flat base of the central body a slot radial channel with a conical cross section and with an axial outlet, in that in accordance with the invention, the central body is made with a flat outlet base which is capable of being deflected from a position perpendicular to the longitudinal axis of the nozzle, and the casing is capable of axial movement effecting a change of the area of the critical cross section of the nozzle.

In order to adjust the intensity (modulus) of the thrust it is desirable that the outlet edges of the casing of the nozzle be made capable of radial movement relative to the end face. This provides for a change in the parameters of the braking zone, first of all, the effective area of the braking zone.

It is advisable that the central body be made of several (at least two) sector-like hinged separate elements linked to each other by a drive.

It is preferable that the casing of the nozzle has an autonomous drive of axial movement.

It is preferable that the central body of the nozzle has an autonomous drive for deflection of the flat outlet base from a position perpendicular to the longitudinal axis of the nozzle.

Furthermore, it is desirable that the casing of the nozzle be made turnable with respect to the housing and be mounted on the housing of the nozzle on a ball-and-socket suspension support with a drive.

BRIEF DESCRIPTION OF THE DRAWINGS

Other objects and advantages of the present invention will be better understood if consideration is given to the description of examples of realization given below and the drawings wherein.

DETAILED DESCRIPTION OF THE INVENTION

The method of producing a thrust in accordance with the invention consists of the following.

Gaseous products produced for example in a combustion chamber are fed in a gas channel to an annular nozzle with a supercritical pressure drop in which the gaseous products are accelerated to subsonic speed, flowing along a central body with the stream axially directed. Then the gaseous products moving in opposing radial jets over the flat surface of the base of the central body are accelerated to a supersonic speed and directed to a braking zone with subsequent discharge into the ambient medium as an axial stream. The jet braking effect of the opposing radial jets is realized, causing an increase in the pressure on the flat surface of the base of the central body from a value $P_{crit}$ in the critical cross section of the nozzle to the value $P_o^1 = K\, P_o$, close to the value of the full pressure P of the exhaust gaseous products at the input to the nozzle where the value of the coefficient K characterizing the degree of restoration of full pressure is within the range of from 0.7 to 0.9.

Figure 1:
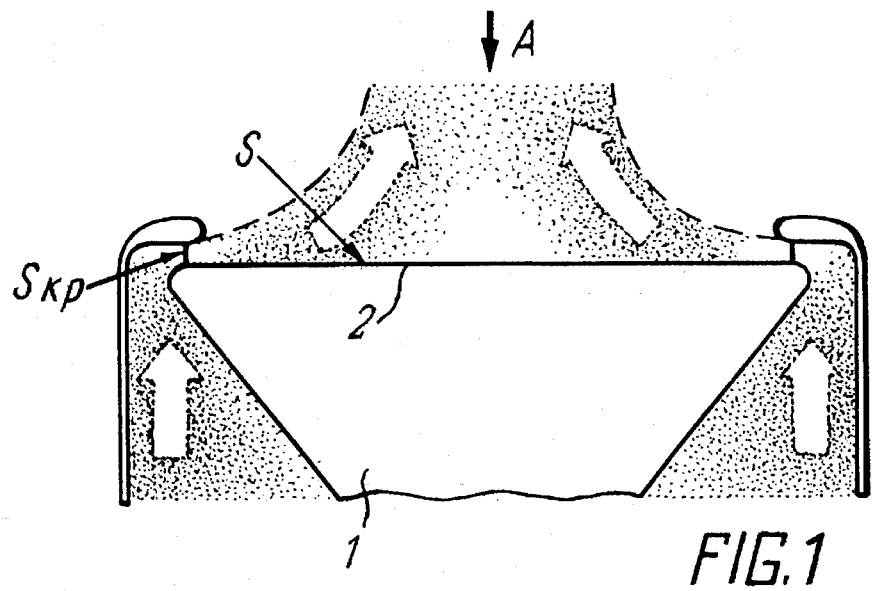
FIG. 1 is a diagram of formation of opposing radial jets along the flat surface of the base of the central body in an axisymmetrical nozzle, illustrating the process of realization of the method for producing thrust.
Figure 2:
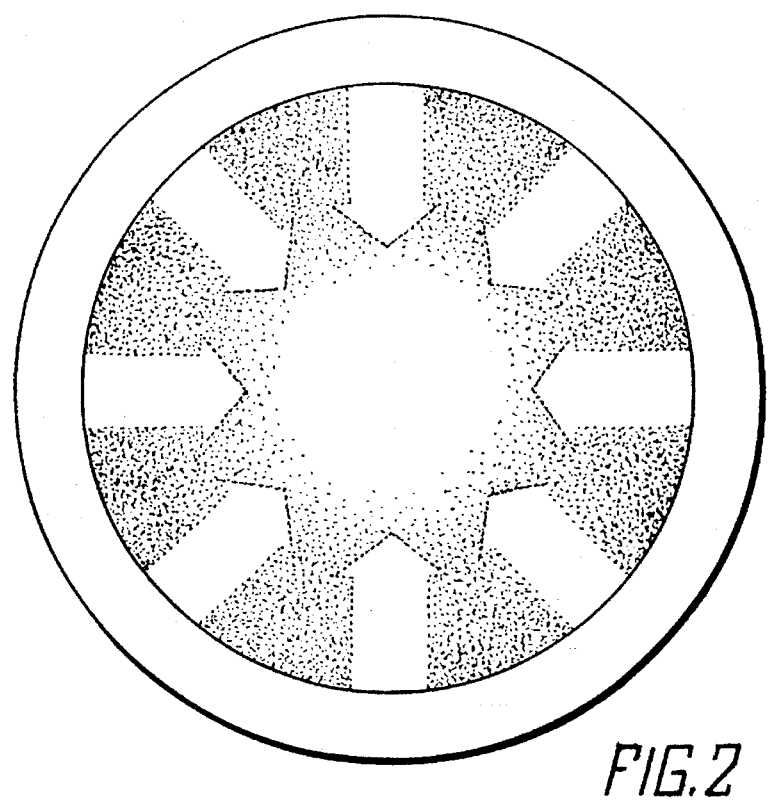
FIG. 2 is a view in the direction of arrow A in FIG. 1.
Figure 3:
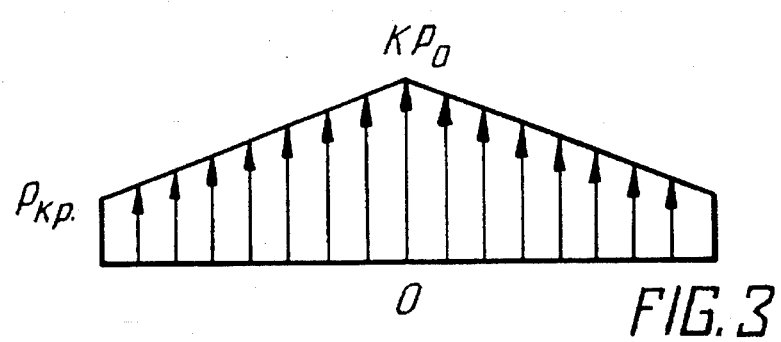
FIG. 3 is a diagram showing the distribution of pressure over the flat surface of the base of the central body in the case of realization of the method for producing thrust shown in FIG. 1.

A diagram showing the formation of opposing radial jets and the braking zone when the flow over a central body 1 with a flat surface of the base 2 is shown in FIGS. 1 and 2. A diagram of pressure distribution over the flat surface of the base of the central body is shown in FIG. 3.

The intensity of the thrust in this case is determined from the equation $$R = \int P(S)\,dS \tag{1}$$

where

R is the intensity of the thrust,

P(S) is the distribution of pressure over the effective area of the braking zone S, determined as a part of the surface of the base of the central body, the part being limited by the projection of the critical cross section of the nozzle.

The critical cross section of the nozzle is a cylindrical surface having an area $S_{crit}$, the directrix of which is the line of intersection of the inner surface of the outlet edge of the encompassing casing with a tangential plane laid out parallel to the surface of the base of the central body.

Changing the profile of the duct of the nozzle by using the means indicated below makes it possible to independently adjust both the effective area of the braking zone S and the area of the critical cross section $S_{crit}$ and consequently, the ratio of the areas $S/S_{crit}$ which can change within the range of from 3 to 15. The flow rate of the radial stream and the flow rate of the outflowing axial stream, which determine the distribution of the pressure P(S) in the braking zone and consequently the intensity of the thrust, change independently of each other.

Angulation of the flat surface of the base of the central body from a position perpendicular to the longitudinal axis of the nozzle is effected to control the direction of the thrust vector. An effective turning of the stream of gases outflowing from the nozzle takes place and accordingly, the thrust vector is produced as the sum of the pressure forces acting perpendicularly to the flat surface of the base of the central body.

This process is accompanied by an insignificant redistribution of the flow rate of the gaseous products of the axial stream discharged into the ambient medium through the upper and lower parts of the nozzle. For example, when the thrust vector is deflected downwardly, an increase to some degree of the part of the flow rate through the lower part of the nozzle and a corresponding reduction of the part of the flow rate through the upper part of the nozzle take place. This is accompanied by an additional turning of the stream and conversion of the resultant lifting force without a substantial change in the external resistance or loss of thrust in the nozzle.

The method for producing thrust in accordance with the present invention can be accomplished using the multifunctional nozzle shown in FIGS. 4, 5, 6, 7, 8.

Figure 4:
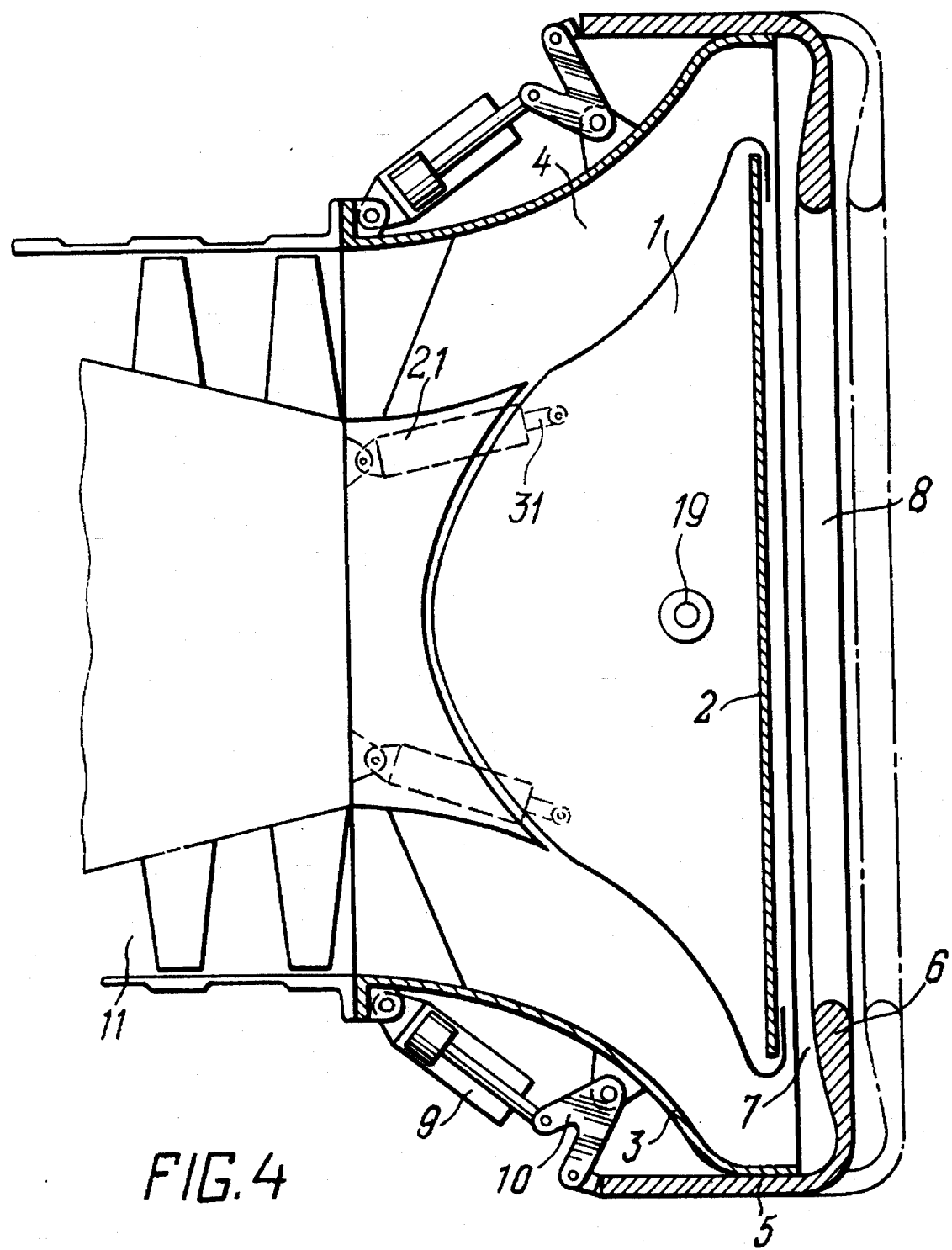
FIG. 4 is a view of an axisymmetrical nozzle which is provided with a central body having a flat outlet base and with a casing made adaptable for axial movement.

An axisymmetrical nozzle which is made with a central body 1 having a flat outlet base 2, the surface of which is positioned perpendicular to the axis of the nozzle, is shown in FIG. 4. The nozzle comprises a housing 3 which forms together with the central body 1 an annular duct 4. A casing 5 in the form of a sleeve is mounted on the housing 3 of the nozzle so as to be adaptable for movement. Outlet edges 6 are on the end face of the casing 5, the edges 6 forming with the flat surface of the base 2 a radial channel 7 with a critical cross section passing into an axial discharge duct 8. The casing 5 has an autonomous drive including a hydraulic cylinder 9 and kinematic linkage 10 providing the capability of axial movement of the casing. The dot-and-dash lines in FIG. 4 show the position of the outlet edges 6 when the critical cross section $S_{crit}$ of the nozzle increases due to axial movement of the casing 5, which accordingly changes the ratio $S/S_{crit}$ and the intensity of the thrust R.

The nozzle is coupled by means of a gas channel 11 to a turbocompressor assembly (not shown in FIG. 4), which can be constructionally made in various embodiments providing a supercritical drop of the pressure of the gas flow in the nozzle.

FIG. 4 also illustrates means for angularly moving the body 1 to change the position of the flat base 2 of the body 1 from a perpendicular position relative to the longitudinal axis of the housing 4 to an inclined position relative thereto. For this purpose, central body 1 is mounted on a hinge joint 19 and is connected to hydraulic cylinders 21 by kinematic linkage 31.

Figure 5:
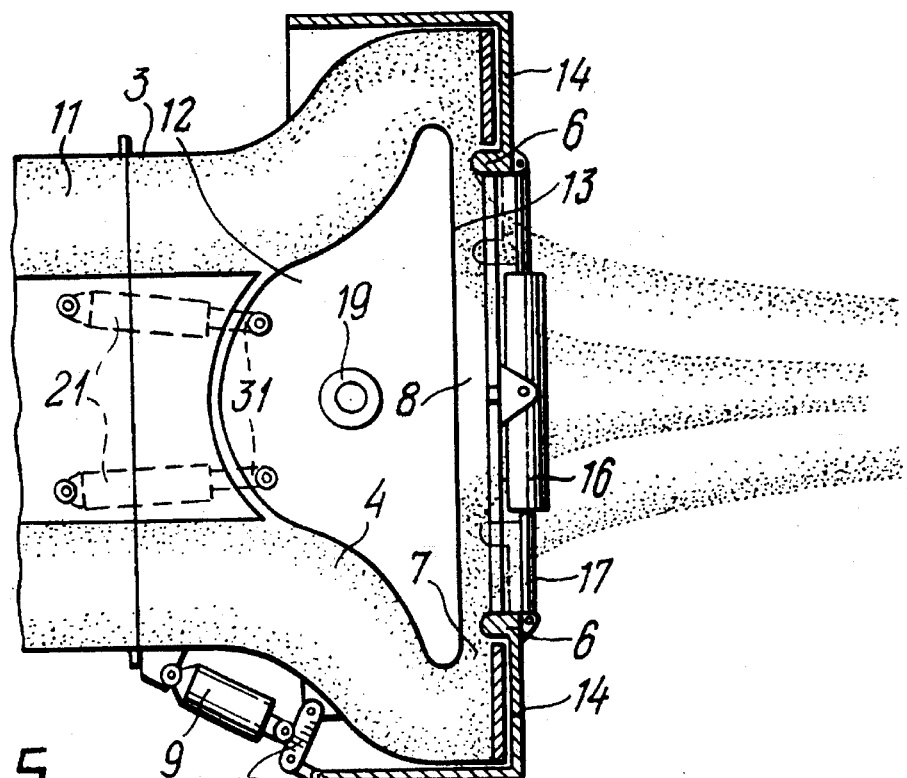
FIG. 5 is a diagrammatic view of a flat nozzle, the outlet edges of the casing of which are made adaptable for radial movement parallel to the flat surface of the base of the central body.

A flat nozzle is shown in FIG. 5 with central body 1 having flat outlet base 2. The nozzle is provided with a casing comprising two flaps 14 with outlet edges 6 on its end face. The flaps 14 are mounted on a housing 15 of the nozzle so as to be adaptable for radial movement parallel to the flat surface of the base 2 and are coupled to each other by a drive comprising a hydraulic cylinder 16 and kinematic linkage 17. When the flaps 14 are moved radially, for example, to the position shown by the dot-and-dash lines, a reduction of the effective area S of the braking zone occurs which accordingly changes the ratio $S/S_{crit}$ and the thrust intensity R. Axial movement of the casing and its flaps 14 is achieved in the same manner as in FIG. 4 by hydraulic cylinders 9 and linkages 10 (only one of which is shown at the bottom of FIG. 5). The central body 1 is angularly movable on hinge joint 19 as in FIG. 4 by means of hydraulic cylinders 21.

Figure 6:
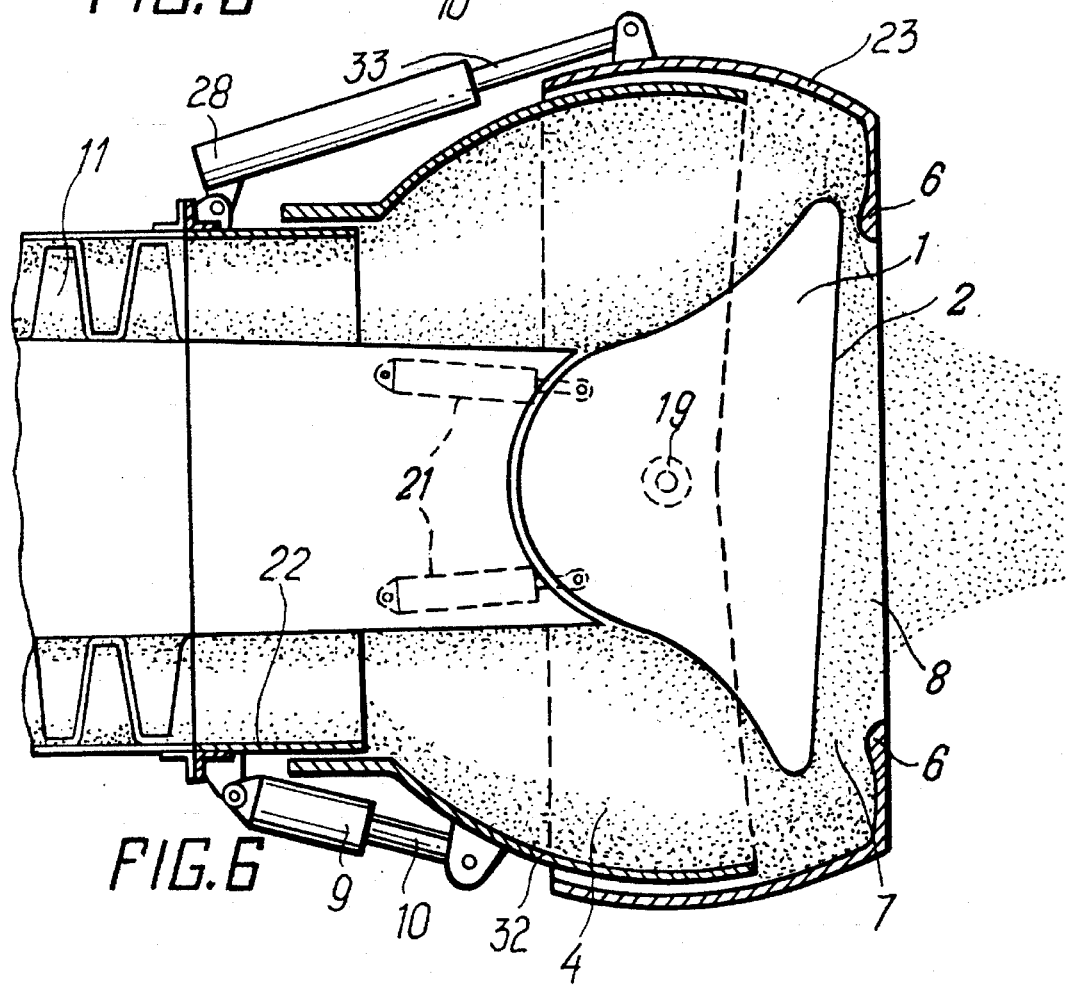
FIG. 6 is a view of a nozzle with a central body made adaptable for deflection of the flat base.

An axisymmetrical nozzle with central body 1 is shown in FIG. 6. The central body 18 is mounted on hinge joint 19 so as to be adaptable for deflection of flat base 2 from a position perpendicular to the axis of the nozzle by means of hydraulic cylinders 21 which make it possible to change the direction of the thrust vector.

Housing 22 of the nozzle and surrounding casing 23 are constructionally connected, for example, as an articulated joint for relative angular movement in the manner of the ball and socket joint of FIG. 7 to be described later. In order to provide for an angular movement of casing 23 and for axial adjustment thereof as in FIG. 4, hydraulic cylinders 9 and 28 are provided, the latter being kinematically connected to casing 23 by linkage 33.

Figure 7:
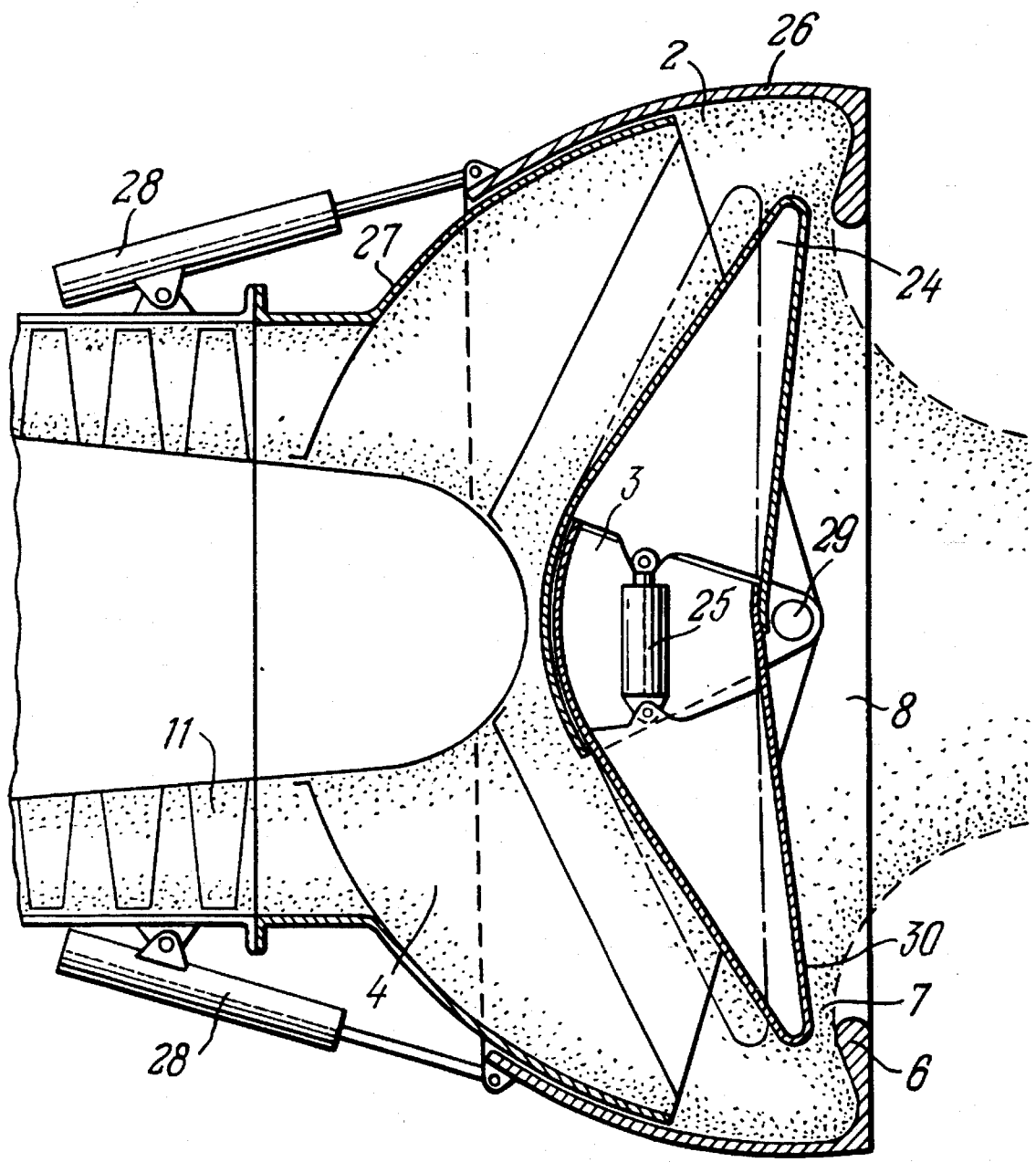
FIG. 7 is a view of an embodiment of the nozzle, the encompassing casing of which is mounted on a ball-and-socket suspension support, while the central body is made of separate sector-like elements connected to each other by a drive.

An axisymmetrical nozzle is shown in FIG. 7 with a central body consisting of two separate sector-like elements 24 coupled to each other by hydraulic cylinder 25. Casing 26 of the nozzle is mounted on a housing 27 by means of a ball-and-socket suspension support and is provided with a drive comprising hydraulic cylinders 28 providing for turning the casing 26 relative to an axis lying in a plane perpendicular to the axis of the nozzle. As a result the outflowing stream of gases turns and the thrust vector is deflected. Elements 24 of the central body are mounted on a joint 29 adaptable for deflection together with the casing 26 and making it possible to change the position of base 30 relative to the outlet edges 6 of the casing 26 (as shown by the dot-and-dash lines) which makes it possible to change the size of the critical cross section $S_{crit}$ and accordingly the thrust intensity R with symmetrical positioning of separate elements 24 relative to the axis of the nozzle and to amplify the effect of deflection of the thrust vector in the case of asymmetrical positioning of the separate elements 24.

The advantages of the invention may be fully manifested when improved, more sophisticated aircraft are developed having high speed parameters and maneuverability due to improvement of the takeoff and landing characteristics or to provision for the possibility for vertical takeoff and landing and improvement of the flight characteristics of aircraft in conditions of combat maneuvering and especially large angles of attack.

It should be noted that the forms of a nozzle with an adjustable thrust vector which are described above and shown in the drawings are only possible preferable embodiments of realization of the invention. For example, the elements and units of a nozzle with a central body shown in the drawings can be replaced by equivalents or be used in another combination if that does not extend beyond the scope of the invention.

What is claimed is:

1. A process for producing thrust, comprising the steps of:
    forming an annular stream with an axially directed velocity vector from gaseous combustion products incoming with a supercritical pressure drop;

accelerating said gaseous combustion products in the annular stream to a subsonic speed;

converting said axial annular stream of said gaseous combustion products into radial jets by changing the direction of movement of said gaseous combustion products from axial to radial with opposing velocity vectors of said radial jets;

accelerating said gaseous combustion products as radial jets to supersonic speed;

adjusting the thrust modulus by changing the flow rate of said radial jets of said gaseous combustion products;

colliding said opposing radial jets, resulting in their braking and a change of the direction of the velocity vector of said gaseous combustion products from radial to axial to form an outflowing axial stream;

adjusting the thrust modulus by changing the flow rate of said outflowing axial stream;

changing the direction of the thrust vector by changing the direction of the velocity vector of said outflowing axial stream by deflecting it from the axial direction during the discharge into the ambient medium.

2. A nozzle for producing thrust comprising:

a housing;

a central body with a flat base, said body being mounted coaxially in said housing;

a casing coaxially on said housing and formed as a sleeve having side walls encompassing said central body and an end face provided with profiled outlet edges, said end face forming with the flat base of said central body a radial channel with a critical cross section and an axial outlet;

means for axially moving said casing relative to said housing comprising a hydraulic cylinder secured on the housing and a linkage of connecting said hydraulic cylinder to said casing;

means for angularly moving said flat base of said central body from a position perpendicular to the longitudinal axis of said housing to an angulated position relative to said longitudinal axis of said housing, the latter said means comprising a hydraulic cylinder secured to said housing and to said central body.

3. The nozzle for producing thrust as in claim 2, wherein said outlet edges are movable in a radial direction relative to said end face of said casing; and further comprising means for radially moving said outlet edges relative to said end face of said casing, the latter said means comprising a hydraulic cylinder secured to said casing and to said outlet edges.

4. The nozzle for producing thrust as in claim 2, in which said casing is mounted on said housing for turning of said casing relative to said housing; and further comprising means for turning said casing relative to said housing comprising a hydraulic drive means secured to said housing and to said casing.

* * * * *